(12) United States Patent
Hsieh et al.

(10) Patent No.: US 10,640,635 B2
(45) Date of Patent: May 5, 2020

(54) RESIN COMPOSITION AND APPLICATION THEREOF

(71) Applicant: Chi Mei Corporation, Tainan (TW)

(72) Inventors: Kuan-Lin Hsieh, Tainan (TW); Chih-Wei Tsai, Tainan (TW)

(73) Assignee: Chi Mei Corporation, Tainan (TW)

( * ) Notice: Subject to any disclaimer, the term of this patent is extended or adjusted under 35 U.S.C. 154(b) by 49 days.

(21) Appl. No.: 15/987,931

(22) Filed: May 24, 2018

(65) Prior Publication Data

US 2019/0010321 A1    Jan. 10, 2019

(30) Foreign Application Priority Data

Jul. 5, 2017   (TW) .............................. 106122613 A

(51) Int. Cl.
| | |
|---|---|
| *C08K 3/26* | (2006.01) |
| *C08L 25/08* | (2006.01) |
| *C08K 3/014* | (2018.01) |
| *C08L 53/02* | (2006.01) |
| *C08F 236/10* | (2006.01) |
| *C08F 212/10* | (2006.01) |

(52) U.S. Cl.
CPC .............. *C08L 25/08* (2013.01); *C08K 3/014* (2018.01); *C08K 3/26* (2013.01); *C08L 53/025* (2013.01); *C08F 212/10* (2013.01); *C08F 236/10* (2013.01); *C08F 2500/01* (2013.01); *C08F 2500/03* (2013.01); *C08F 2800/20* (2013.01); *C08K 2003/265* (2013.01); *C08K 2003/267* (2013.01); *C08L 2205/02* (2013.01)

(58) Field of Classification Search
CPC .......... C08K 3/014; C08K 3/26; C08K 3/013; C08K 5/01; C08K 2003/267; C08L 25/08; C08L 53/025; C08L 25/06; C08L 25/12; C08L 33/12; C08L 51/04; C08L 2205/02; C08F 2500/01; C08F 2800/20; C08F 236/10; C08F 212/10; C08F 2003/265; C08F 2500/03
See application file for complete search history.

(56) References Cited

U.S. PATENT DOCUMENTS

| | | | | |
|---|---|---|---|---|
| 3,976,608 A | * | 8/1976 | Buckler et al. .......... | C08J 3/226 524/13 |
| 2005/0256265 A1 | * | 11/2005 | Wright et al. .......... | C08L 53/02 525/88 |

FOREIGN PATENT DOCUMENTS

| | | |
|---|---|---|
| JP | S57212249 | 12/1982 |
| JP | S58132033 | 8/1983 |
| JP | S60108458 | 6/1985 |
| JP | S60170650 | 9/1985 |
| JP | 2016203633 | 12/2016 |
| TW | 201716497 | 5/2017 |
| WO | 2016125899 | 8/2016 |

OTHER PUBLICATIONS

"Office Action of Japan Counterpart Application," dated Sep. 3, 2019, p. 1-p. 4.

* cited by examiner

*Primary Examiner* — Nathan M Nutter
(74) *Attorney, Agent, or Firm* — JCIPRNET

(57) ABSTRACT

A resin composition and an application thereof are provided, wherein the resin composition includes a thermoplastic elastomer, a styrene-based resin, a processing oil, and a filler. Based on 100 wt % of the resin composition, the content of the thermoplastic elastomer is 20 wt % to 55 wt %, the content of the styrene-based resin is 25 wt % to 55 wt %, the content of the processing oil is 6 wt % to 18 wt %, and the content of the filler is 5 wt % to 20 wt %. A printing material made by the resin composition has good adhesion with a substrate.

17 Claims, No Drawings

RESIN COMPOSITION AND APPLICATION THEREOF

CROSS-REFERENCE TO RELATED APPLICATION

This application claims the priority benefits of Taiwan application serial no. 106122613, filed on Jul. 5, 2017. The disclosure of which is hereby incorporated by reference herein in its entirety.

BACKGROUND

Field of the Invention

The disclosure relates to a resin composition technique, and more particularly, to a resin composition and an application thereof.

Description of Related Art 3D printing is a rapid molding technique, and it is based on digital modeling files and utilizes a starting material such as metal, ceramic, or polymer to form an object by printing layer by layer via different printing means. The shape of the starting material for 3D printing may be powder, liquid, or filament.

From a technical perspective, more than ten different 3D printing rapid molding methods currently have been developed, such as stereolithography (SLA), selective laser sintering (SLS), fused deposition modeling (FDM), laminated object manufacturing (LOM), or solid ground curing (SGC).

Using fused deposition modeling as an example, the 3D model of the CAD is divided into very thin layers of 2D cross sections and converted into 2D geometric information controlling the movement trajectory of fused deposition modeling nozzle. Next, a thermoplastic polymer material such as acrylonitrile-butadiene-styrene copolymer (ABS), polylactic acid (PLA) resin, polycarbonate (PC), or nylon plastic is heated to a critical state by a heating head (print nozzle) for fused deposition modeling, and then the semi-fluid material is extruded by the nozzle along a movement trajectory of 2D geometric information confirmed by CAD under computer control such that it is solidified into thin layers having a contour shape. Next, the layers are stacked and combined to complete a 3D molded article.

Currently, the thermoplastic polymer material used in the 3D printing generally has the issue of poor adhesion with a substrate, and the issue of poor adhesive strength may even be present between the material layers.

SUMMARY

The disclosure provides a resin composition that can be made into a 3D printing material having good adhesion with a substrate.

A resin composition of the disclosure includes a thermoplastic elastomer, a styrene-based resin, a processing oil, and a filler. In particular, based on 100 wt % of the resin composition, the content of the thermoplastic elastomer can be 20 wt % to 55 wt %, the content of the styrene-based resin can be 25 wt % to 55 wt %, the content of the processing oil can be 6 wt % to 18 wt %, and the content of the filler can be 5 wt % to 20 wt %.

The disclosure further provides a filament formed by the resin composition.

The disclosure further provides a method of fused deposition modeling, wherein the filament is used as a printing material.

The disclosure further provides a molded article formed by the filament.

Based on the above, in the disclosure, a resin composition formed by a specific component ratio is used as the filament, and the filament is used as a printing material of fused deposition modeling; therefore, adhesion with a substrate can be improved, and the adhesive strength between material layers can be further improved.

In order to make the aforementioned features and advantages of the disclosure more comprehensible, embodiments are described in detail below.

DESCRIPTION OF THE EMBODIMENTS

In the following, the embodiments of the disclosure are described in detail. However, these embodiments are exemplary, and the disclosure is not limited thereto.

In an embodiment of the disclosure, a resin composition includes a thermoplastic elastomer, a styrene-based resin, a processing oil, and a filler. In particular, based on 100 wt % of the resin composition, the content of the thermoplastic elastomer can be 20 wt % to 55 wt %, the content of the styrene-based resin can be 25 wt % to 55 wt %, the content of the processing oil can be 6 wt % to 18 wt %, and the content of the filler can be 5 wt % to 20 wt %. In the following, the disclosure is described in detail.

Thermoplastic Elastomer

The thermoplastic elastomer of the present embodiment includes a styrene-based copolymer elastomer. In the styrene-based copolymer elastomer, the hard segment can be a styrene polymer, and the soft segment can be composed by at least one polymer of polybutadiene and polyisoprene, or a hydride thereof. The proportion of the hard segment and the soft segment is, for instance, 10:90 to 90:10 (molar ratio), preferably 10:90 to 50:50. The combination of the hard segment and the soft segment can include di-blocks or tri-blocks.

The styrene-based copolymer elastomer can include, but is not limited to, for instance, one of a styrene-butadiene-styrene (SBS) block copolymer, a styrene-isoprene-styrene (SIS) block copolymer, a styrene-ethylene-butylene-styrene (SEBS) block copolymer, a styrene-ethylene-propylene-styrene (SEPS) block copolymer, a styrene-ethylene-(ethylene-propylene)-styrene (SEEPS) block copolymer, or a mixture of the above. For instance, the following can be used: Kraton G series and Kraton D series of Kraton Performance Polymers, Inc.; Septon series and Hybrar series of Kuraray Co., Ltd.; Taipol series and Vector series of TSRC Corporation; or YH-503 of China Yueyang Petrochemical, but the disclosure is not limited thereto.

From the perspective of moldability and preventing breakage when the filament is used as the 3D printing material, the thermoplastic elastomer is preferably at least one selected from the group consisting of a styrene-butadiene-styrene block copolymer (SBS) and a styrene-ethylene-butylene-styrene block copolymer (SEBS).

In an embodiment, the number-average molecular weight of the thermoplastic elastomer is, for instance, 20,000 to 180,000, preferably 30,000 to 160,000, and more preferably 35,000 to 140,000. If the number-average molecular weight of the thermoplastic elastomer is less than 20,000, then the strength and the dimensional stability of the resulting molded article may be poor; and if the number-average molecular weight of the thermoplastic elastomer is greater than 180,000, then the processability and the productivity may be reduced.

In an embodiment, the content of the styrene monomer unit in the thermoplastic elastomer is, for instance, 10 wt % to 50 wt %, preferably 20 wt % to 40 wt %, and more preferably 25 wt % to 35 wt %.

Styrene-Based Resin

The styrene-based resin in the present embodiment can be one of a polymer of a styrene-based monomer, a copolymer of a styrene-based monomer and other copolymerizable monomers, a styrene-based graft copolymer, or a mixture thereof.

The synthesis method of the styrene-based resin can be a known method such as an emulsion polymerization method, a solution polymerization method, a suspension polymerization method, or a bulk polymerization method.

The styrene-based monomer is preferably styrene, α-methylstyrene, or p-methylstyrene. Therefore, the styrene-based resin can be a polystyrene (PS) resin.

The other copolymerizable monomers are preferably, for instance, a cyanide vinyl monomer, an alkyl (meth)acrylate monomer, maleimide, or N-phenylmaleimide. The cyanide vinyl monomer includes, for instance, acrylonitrile or methacrylonitrile. The alkyl (meth)acrylate monomer includes, for instance, methyl acrylate, ethyl acrylate, propyl acrylate, methyl methacrylate, or ethyl methacrylate. Therefore, the styrene-based resin can also be, for instance, an acrylonitrile-styrene (AS) resin, a methyl methacrylate-styrene (MS) resin, and so on.

The styrene-based graft copolymer can specifically be a high-impact polystyrene (HIPS) resin, an acrylonitrile-butadiene-styrene (ABS) resin, an acrylonitrile-(ethylene-propylene rubber)-styrene (AES) resin, or an acrylonitrile-acrylate-styrene (AAS) resin.

From the perspective of the adhesive strength between the material layers in the resulting molded article, the styrene-based resin is preferably a PS resin or a HIPS resin. When high impact is expected, the styrene-based resin is more preferably a HIPS resin.

In an embodiment, the content of styrene-based monomer unit in the styrene-based resin is, for instance, 48 wt % to 100 wt %; preferably 92 wt % to 100 wt %. When the content of styrene-based monomer unit is less than 92 wt %, the adhesive strength between the material layers in the molded article may be affected, but the adhesion of the resin composition and the substrate is not affected.

Processing Oil

The processing oil in the present embodiment can be any common processing oil such as one or a plurality selected from white mineral oil, paraffin oil, organic silicone oil, castor oil, palm oil, epoxy soybean oil, or an environmentally-friendly plasticizer of some cases. From the perspective of softening the resin, the processing oil is preferably white mineral oil.

The processing oil can specifically include, but is not limited to, for instance, Diana Fresia S32, Diana Process Oil PW-90, or Process Oil NS100 of Idemitsu Kosan Co.; White Oil Lily 500, White Oil Broom 350, or DN Oil KP-68 of Kukdong Oil & Chem Corporation; Enerper M1930 of BP Chemicals Corporation; Kaydol of Crompton Corporation; Primol 352 of Esso Corporation; KN4010 of PetroChina Company Corporation; or 380N or 550N of Formosa Petrochemical Corporation.

Filler

In the present embodiment, the filler can be an inorganic filler. The inorganic filler is, for instance, talcum powder, gypsum powder, asbestos powder, pottery clay, clay, mica powder, kaolin, carbon, calcium carbonate, magnesium carbonate, barium sulfate, magnesium sulfate, aluminum oxide, silicon oxide, magnesium oxide, iron oxide, titanium oxide, zinc oxide, tin oxide, silicon nitride, aluminum nitride, calcium silicate, aluminum silicate, zirconium silicate, or potassium titanate. The inorganic filler can be used alone or in multiple combinations.

In an embodiment, the particle size (average particle size) of the inorganic filler can be between 10 nm and 100 μm, such as 20 nm and 75 μm; preferably 50 nm and 50 μm; and more preferably 50 nm and 10 μm.

From the perspective of the adhesive strength between the material layers in the resulting molded article, the filler is preferably at least one selected from the group consisting of calcium carbonate and magnesium carbonate. The calcium carbonate can include, but is not limited to, for instance, the Vicron series of Specialty Minerals Inc.; the SS series and NS series of Formosa Plastics Corporation; or B-200 of Yuncheng Chemical Industry Co., Ltd.

Antioxidant

In the present embodiment, the resin composition can further include an antioxidant. The antioxidant is, but not limited to, for instance, a phenol-based antioxidant, a thioether-based antioxidant, a phosphorus-based antioxidant, a hindered amine-based antioxidant, or a thiol-based antioxidant. The antioxidant can be used alone or in multiple combinations.

The phenol-based antioxidant can be used alone or in combination, and the phenol-based antioxidant is, but not limited to, for instance, triethylene glycol bis[3-(3-tert-butyl-5-methyl-4-hydroxylphenyl)propionate], tetrakis[methylene-3-(3,5-di-tert-butyl-4-hydroxylphenyl)propionate]methane, 2-tert-butyl-6-(3-tert-butyl-2-hydroxyl-6-methylbenzyl)-4-methylphenylacrylate, 2,2'-methylene-bis(4-methyl-6-tert-butylphenol) (model: antioxidant 2246), 2,2'-thiobis(4-methyl-6-tert-butylphenol), tetrakis[β-(3,5-di-tert-butyl-4-hydroxylphenyl)propionic acid]pentaerythritol ester (model: antioxidant 1010), 2,6-di-tert-butyl-4-methylphenol (model: antioxidant 264), β-(3,5-di-tert-butyl-4-hydroxylphenyl)n-octadecyl propionate (model: antioxidant 1076), 2,2'-thio-diethylene-bis[3-(3,5-di-tert-butyl-4-hydroxylphenyl)propionate], or 2,2'-ethylenediamine-bis[ethyl-3-(3,5-di-tert-butyl-4-hydroxylphenyl)propionate].

The thioether-based antioxidant can be used alone or in combination, and the thioether-based antioxidant is, but not limited to, for instance, distearylacetylthiodipropionate, dipalmitoylacetylthiodipropionate, pentacrythritol-tetrakis-(β-dodecamethyl-sulfur propionate), bis(3,5-tert-butyl-4-hydroxylphenyl)sulfide), or dioctadecyl thioether.

The phosphorous-based antioxidant can be used alone or in combination, and the phosphorous-based antioxidant can be selected from a phosphorous-based antioxidant containing phosphite or a phosphorous-based antioxidant containing phosphate. The phosphorous-based antioxidant containing phosphite is, but not limited to, for instance, tris(nonylphenyl)phosphite, dodecyl phosphite, 4,4'-butylidenebis(3-methyl-6-tert-butylphenyl-bis-tridecyl phosphite), bis(2,4-di-tert-butylphenol)pentaerythritol diphosphite (model: antioxidant 626), or tris(2,4-di-tert-butylphenyl)phosphite (model: antioxidant 168). The phosphorous-based antioxidant containing phosphate is, but not limited to, for instance, tetrakis(2,4-tert-butylphenyl)-4,4'-biphenylene phosphate or 9,10-dihydro-9-oxo-10-phosphoric phenanthrene-10-oxido.

The hindered amine-based antioxidant can be used alone or in a mixture, and the hindered amine-based antioxidant is, but not limited to, for instance, naphthylamine, diphenylamine, or p-phenylenediamine.

The thiol-based antioxidant can be used alone or in a mixture, and the thiol-based antioxidant is, but not limited to, for instance, thiodipropionate dilaurate (DLTP) or dilauryl thiodipropionate (DLTDP).

From the safety perspective, the antioxidant is preferably a phenol-based antioxidant, a phosphorus-based antioxidant containing phosphite, or a thiol-based antioxidant. For instance, the antioxidant can be, but is not limited to, for instance, Irganox series of BASF SE; or Songnox series of Songwon Industrial Co., Ltd.

Resin Composition

In the present embodiment, the preparation method of the resin composition is not particularly limited, and a regular mixing method can be used, such as evenly mixing the thermoplastic elastomer and the styrene-based resin with, for instance, the processing oil and the filler.

In the present embodiment, based on 100 wt % of the resin composition, the content of the thermoplastic elastomer can be 20 wt % to 55 wt %, the content of the styrene-based resin can be 25 wt % to 55 wt %, the content of the processing oil can be 6 wt % to 18 wt %, and the content of the filler can be 5 wt % to 20 wt %.

If the adhesive strength of the material layers is to be further improved, then based on 100 wt % of the resin composition, the content of the thermoplastic elastomer is preferably 30 wt % to 55 wt %, the content of the styrene-based resin is preferably 25 wt % to 50 wt %, the content of the processing oil is preferably 8 wt % to 15 wt %, and the content of the filler is preferably 6 wt % to 13 wt %; the content of the thermoplastic elastomer is more preferably 40 wt % to 50 wt %, the content of the styrene-based resin is more preferably 30 wt % to 40 wt %, the content of the processing oil is more preferably 10 wt % to 15 wt %, and the content of the filler is more preferably 7 wt % to 11 wt %.

The filament of another embodiment of the disclosure is formed by the resin composition. The preparation method of the filament is not particularly limited herein, and can include heating the resin composition to a temperature greater than the fusion temperature of the polymer material for mixing to obtain a melted body and then extruding the melted body from an extruder, then granulating using an underwater pelletizer to obtain a material in the form of soft particles. Next, the material having the form of soft particles is fused again and extruded by an extruder, and then is shaped by cooling in a sink at room temperature to form a filament. Next, the filament strand is drawn with a traction machine and rolled by a winding machine to obtain a standard packaged printing material. The mixing method is, for instance, performed using a known mixing machine. The extrusion method is, for instance, performed using a known twin screw extruder or a single screw extruder.

In the method of fused deposition modeling of still yet another embodiment of the disclosure, the abovementioned filament is used as the printing material. For instance, the filament can be fed into the nozzle via a filament supply mechanism and be heated to a fused state in the nozzle and then extruded via the nozzle. The filament in fused state is extruded and deposited at a specified location according to a path controlled by the computer aided design (CAD) hierarchical data to be solidified and molded, and then deposited layer by layer and solidified to form an entire 3D product.

The molded article of yet another embodiment of the disclosure is formed by the abovementioned filament. Since the resin composition of the disclosure has specific components with a limited range of component ratios, a filament having good adhesion with a substrate and good adhesive strength between material layers can be obtained as the printing material, and a molded article that does not peel off into layers can be obtained.

In the following, several experiments are provided to more specifically describe the resin composition of the disclosure. Although the following experiments are described, the materials used and the amounts and ratios thereof, as well as handling details and handling process, etc., can be suitably modified without exceeding the scope of the disclosure. Accordingly, restrictive interpretation should not be made to the disclosure based on the experiments described below.

Raw Materials Used in Examples and Comparative Examples

A1: styrene-ethylene-butylene-styrene block copolymer (SEBS), the content of the styrene monomer unit: 30 wt %.

Preparation of A1: hydrogenation catalyst dimethyl dicyclopentadienyl titanium was diluted in cyclohexane to form 0.01 M of a catalyst solution (based on Ti concentration). The resulting catalyst solution was directly used in the hydrogenation reaction of the styrene-butadiene-styrene (SBS) polymer. The preparation method of the SBS polymer (a linear block copolymer, number-average molecular weight: 100,000) includes first performing an anionic polymerization step and then terminating the active chain with isopropyl alcohol, and then filtering and drying in vacuum overnight. The SBS polymer contains 30 wt % of a styrene unit and 70 wt % of a butadiene unit (containing 39 wt % of a 1,2-ethylene structure). Next, 15 g of the SBS polymer was dissolved in 125 mL of cyclohexane. The resulting SBS/cyclohexane solution was directly used in the hydrogenation. The hydrogenation of the SBS polymer was performed in a 500-mL autoclave at a $H_2$ pressure of 200 psi and 60° C. by using cyclohexane as the reaction solvent. After the reaction was maintained at a $H_2$ pressure of 200 psi and 60° C. for 60 minutes, the reaction solution was quenched by isopropyl alcohol. The mixture was filtered and dried overnight at 40° C. to obtain a styrene-ethylene-butylene-styrene (SEBS) block copolymer A1.

A2: styrene-ethylene-butylene-styrene (SEBS) block copolymer, the content of the styrene monomer unit: 30 wt %.

Preparation of A2: hydrogenation catalyst dimethyl dicyclopentadienyl titanium was diluted in cyclohexane to form 0.01 M of a catalyst solution (based on Ti concentration). The resulting catalyst solution was directly used in the hydrogenation reaction of the styrene-butadiene-styrene (SBS) polymer. The preparation method of the SBS polymer (a linear block copolymer, number-average molecular weight: 100,000) includes first performing an anionic polymerization step and then terminating the active chain with isopropyl alcohol, and then filtering and drying in vacuum overnight. The SBS polymer contains 30 wt % of a styrene unit and 70 wt % of a butadiene unit (containing 41 wt % of a 1,2-ethylene structure). Next, 15 g of the SBS polymer was dissolved in 125 mL of cyclohexane. The resulting SBS/cyclohexane solution was directly used in the hydrogenation. The hydrogenation of the SBS polymer was performed in a 500-mL autoclave at a $H_2$ pressure of 200 psi and 60° C. by using cyclohexane as the reaction solvent. After the reaction was maintained at a $H_2$ pressure of 200 psi and 60° C. for 60 minutes, the reaction solution was quenched by isopropyl alcohol. The mixture was filtered and dried overnight at 40° C. to obtain a styrene-ethylene-butylene-styrene (SEBS) block copolymer A2.

A3: styrene-ethylene-butylene-styrene (SEBS) block copolymer, the content of the styrene monomer unit: 30 wt %.

Preparation of A3: hydrogenation catalyst dimethyl dicyclopentadienyl titanium was diluted in cyclohexane to form 0.01 M of a catalyst solution (based on Ti concentration). The resulting catalyst solution was directly used in the hydrogenation reaction of the styrene-butadiene-styrene (SBS) polymer. The preparation method of the SBS polymer (a linear block copolymer, number-average molecular weight: 100,000) includes first performing an anionic polymerization step and then terminating the active chain with isopropyl alcohol, and then filtering and drying in vacuum overnight. The SBS polymer contains 30 wt % of a styrene unit and 70 wt % of a butadiene unit (containing 39 wt % of a 1,2-ethylene structure). Next, 15 g of the SBS polymer was dissolved in 125 mL of cyclohexane. The resulting SBS/cyclohexane solution was directly used in the hydrogenation. The hydrogenation of the SBS polymer was performed in a 500-mL autoclave at a $H_2$ pressure of 180 psi and 70° C. by using cyclohexane as the reaction solvent. After the reaction was maintained at a $H_2$ pressure of 180 psi and 70° C. for 60 minutes, the reaction solution was quenched by isopropyl alcohol. The mixture was filtered and dried overnight at 40° C. to obtain a styrene-ethylene-butylene-styrene (SEBS) block copolymer A3.

B1: high-impact polystyrene (HIPS) resin, the content of the styrene monomer unit: 92 wt %.

Preparation of B 1: after raw materials such as 8.2 parts by weight of a polybutadiene rubber (made by Chi Mei, product name: KIBIPOL PR-255, cis structure: 35%), 100 parts by weight of a styrene monomer, 7 parts by weight of ethylbenzene, 2.4 parts by weight of white wax oil, and 0.018 parts by weight of 1,1-bis-peroxy-tert-butyl-3,3,5-trimethylcyclohexane, 0.012 parts by weight of tertiary dodecyl mercaptan, 0.24 parts by weight of octadecyl-3-(3, 5-di-tert-butyl-4-hydroxylphenyl)propionate, and 0.24 parts by weight of zinc stearate were mixed, the mixture was continuously pumped into a reaction system, wherein the reaction system contains: a continuously stirred tank reactor R1 (CSTR) having a volume of 180 L, and a reaction tank temperature of 116° C. to 119° C., wherein the reaction tank temperature was controlled via vacuum reflux so as to adjust the monomer conversion rate to about 25%; next, two plug flow reactors (PFR) R2 and R3 were connected in series, wherein each was 110 L, and the reaction temperature was gradually increased from 125° C. to 175° C. with an increase in the conversion rate, and the final conversion rate was about 80%. Next, the polymer was heated to 230° C. and the unreacted monomer and solvent were recycled in a vacuum of 15 torr, then the polymer was extruded from the die head of an extrusion pump and then dried and pelletized after cooling to obtain a high-impact polystyrene resin (HIPS) B1.

B2: high-impact polystyrene (HIPS), the content of the styrene monomer unit: 95 wt %.

Preparation of B2: after raw materials such as 5 parts by weight of a polybutadiene rubber (made by Chi Mei, product name: KIBIPOL PR-255, cis structure: 35%), 100 parts by weight of a styrene monomer, 7 parts by weight of ethylbenzene, 2.4 parts by weight of white wax oil, and 0.018 parts by weight of 1,1-bis-peroxy-tert-butyl-3,3,5-trimethylcyclohexane, 0.012 parts by weight of tertiary dodecyl mercaptan, 0.24 parts by weight of octadecyl-3-(3,5-di-tert-butyl-4-hydroxylphenyl)propionate, and 0.24 parts by weight of zinc stearate were mixed, the mixture was continuously pumped into a reaction system, wherein the reaction system contains: a continuously stirred tank reactor R1 (CSTR) having a volume of 180 L and a reaction tank temperature of 116° C. to 119° C., wherein the reaction tank temperature was controlled via vacuum reflux so as to adjust the monomer conversion rate to about 25%; next, two plug flow reactors (PFR) R2 and R3 were connected in series, wherein each was 110 L. The reaction temperature was gradually increased from 125° C. to 175° C. with an increase in the conversion rate, and the final conversion rate was about 80%. Next, the polymer was heated to 230° C. and the unreacted monomer and solvent were recycled in a vacuum of 15 torr, then the polymer was extruded from the die head of an extrusion pump and then dried and pelletized after cooling to obtain a high-impact polystyrene resin (HIPS) B2.

B3: polystyrene (PS) resin, the content of the styrene monomer unit: 100 wt %.

Preparation of B3: 150 ppm of 1,1-di-peroxy-tert-butyl-3,3,5-trimethylcyclohexane, 250 ppm of n-dodecyl mercaptan, 110 ppm of 3-(3',5'-bis-tert-butyl-4'-hydroxylphenyl) propionic acid stearyl ester, and 220 ppm of tris-(2,4-di-tert-butyl-phenyl)phosphate were added in 100 parts by weight of a styrene monomer and 8 parts by weight of ethylbenzene to react, wherein the reaction conditions were: pumping the mixture into three plug flow reactors connected in series and having a capacity of 110 L at a flow rate of 40 L/hour, and the reaction inlet temperatures were each kept at 115° C., 130° C., and 150° C., the final conversion rate was 80 wt %, the mixture was heated by a heater at 260° C., unreacted monomers and the inert solvent were removed by a devolatilization device operated at a vacuum of 15 torr, and then the mixture was extruded by an extrusion equipment to obtain a polystyrene (PS) resin B3.

B4: methyl methacrylate-styrene (MS) resin, the content of the styrene monomer unit: 48 wt %.

Preparation of B4: 45 parts by weight of a styrene monomer, 55 parts by weight of a methyl methacrylate monomer, and 12 parts by weight of ethylbenzene were each continuously fed into a fully mixed reactor for a continuous solution polymerization reaction, wherein the reaction temperature was kept at 100° C., and the pressure was 600 torr. Each component was sufficiently stirred and mixed in a fully mixed reactor to form a reactant, and after being left in the reactor about 3.5 hours, the reactant was continuously fed into a laminar flow reactor. In the laminar flow reactor, the mixture was kept for about 5 hours to form a polymer solution. Next, the polymer solution was fed into a devolatilizing device, and after the polymer solution was heated to 235° C., the polymer solution was devolatilized in a reduced pressure environment to obtain a methyl methacrylate-styrene (MS) resin B4.

B5: acrylonitrile-styrene (AS) resin, the content of the styrene monomer unit: 82 wt %.

Preparation of B5: after 80 parts by weight of a styrene monomer, 20 parts by weight of an acrylonitrile monomer, and 8 parts by weight of ethylbenzene were mixed, the mixture was continuously provided to a fully-mixed continuous reactor at a flow rate of 35 kg/hr, wherein the volume of the reactor was 40 L, the internal temperature was kept at 145° C., the pressure was kept at 4 kg/cm$^2$, and the overall conversion rate was about 55%. After the polymerization was complete, the resulting copolymer solution was heated via a preheater, and volatile substances such as unreacted monomers and solvents were removed via a reduced-pressure degassing tank. Next, the resulting polymerized fused object was extruded and granulated to obtain an acrylonitrile-styrene (AS) resin B5.

C1: food-grade white oil 550N (Formosa Plastics).

C2: white oil Lily 500 (Kukdong Oil & Chemicals Co., Ltd.).

D1: calcium carbonate ($CaCO_3$), B-200 (Yun Cheng Chemical, average particle size: 2 μm).

D2: magnesium carbonate ($MgCO_3$), A-106 (Yun Cheng Chemical).

E1: polypropylene resin (PP), ST-611 (LCY Chemical).

AO: AO-50 (Chang Chun Petrochemical).

Example 1

Preparation method: each group was placed in a mixing machine according to the amount ratios shown in Table 1 and sufficiently mixed at room temperature to form evenly mixed materials, then the materials were placed in a parallel twin screw extruder having an aspect ratio (L/D) of 40 or more for fused plasticization under the condition of 180° C. to 220° C. to form a melted body; the melted body was further evenly mixed and pressed from the die of a parallel twin screw extruder and then granulated using an underwater pelletizer to obtain materials in the form of soft particles.

The soft particles were fused and plasticized again by a single screw extruder under the condition of 180° C. to 220° C. to form a melted body; after the melted body was passed through the die of a single screw extruder having a certain caliber, the melted body was cooled in a sink at room temperature for shaping to obtain a filament. The filament strand was drawn with a traction machine and rolled by a winding machine to obtain a standard packaged printing material.

Examples 2 to 10

The same preparation method as example 1 was used, and the difference is the amount and type of each component were changed as shown in Table 1.

Comparative Examples 1 to 3

The same preparation method as example 1 was used, and the difference is the amount and type of each component were changed as shown in Table 1.

Next, the printing materials obtained in examples 1 to 10 and comparative examples 1 to 3 were subjected to the following tests, and the test results are also shown in Table 1.

Test Methods

<Substrate Adhesion>

During the printing process, after the first layer was printed, whether the printed layer was fully adhered to the substrate was visually determined.

○: the material can be successfully printed on the substrate and be fully adhered to the substrate, and coating is uniform.

X: the material cannot be successfully printed on the substrate, and distortion phenomenon occurs to the resulting pattern.

If the adhesion with the substrate was found to be poor, then a subsequent adhesive strength test between the material layers was not performed.

<Adhesive Strength Between Material Layers>

After printing was complete and the molded article was left alone for 30 minutes, the molded article was removed after cooling, and the same experimenter determines whether the printed material layers in the molded article could be separated by hand.

○: the printed material layers in the molded article are not separated.

X: the printed material layers in the molded article are readily separated.

TABLE 1

|  |  |  | Example 1 | Example 2 | Example 3 | Example 4 | Example 5 | Example 6 | Example 7 |
|---|---|---|---|---|---|---|---|---|---|
| Thermoplastic elastomer | A1 | wt % | 42.5 | 45 | 47.5 |  |  | 42.5 | 40 |
|  | A2 | wt % |  |  |  | 20 |  |  |  |
|  | A3 | wt % |  |  |  |  | 20 |  |  |
| Styrene-based resin | B1 | wt % | 35 |  |  | 40 | 40 | 30 | 25 |
|  | B2 | wt % |  | 35 |  |  |  |  |  |
|  | B3 | wt % |  |  | 30 |  |  |  |  |
|  | B4 | wt % |  |  |  | 10 |  |  | 10 |
|  | B5 | wt % |  |  |  |  | 10 |  |  |
| Processing oil | C1 | wt % | 12.5 | 12.5 | 12.5 |  |  | 12.5 | 10 |
|  | C2 | wt % |  |  |  | 15 | 15 |  |  |
| Filler | D1 | wt % | 10 | 7.5 | 10 |  |  | 15 | 15 |
|  | D2 | wt % |  |  |  | 15 | 15 |  |  |
| Polypropylene resin | E1 | wt % |  |  |  |  |  |  |  |
| Antioxidant | AO | wt % |  |  | 0.5 |  |  |  |  |
| Evaluation item | Substrate adhesion |  | ○ | ○ | ○ | ○ | ○ | ○ | ○ |
|  | Adhesive strength between material layers |  | ○ | ○ | ○ | X | X | X | X |

|  |  |  | Example 8 | Example 9 | Example 10 | Comparative example 1 | Comparative example 2 | Comparative example 3 |
|---|---|---|---|---|---|---|---|---|
| Thermoplastic elastomer | A1 | wt % | 42.5 | 40 | 40 | 26 | 28 | 30 |
|  | A2 | wt % |  |  |  |  |  |  |
|  | A3 | wt % |  |  |  |  |  |  |

TABLE 1-continued

| | | | | | | | | |
|---|---|---|---|---|---|---|---|---|
| Styrene-based resin | B1 | wt % | 25 | | 30 | | | |
| | B2 | wt % | | 25 | | | | |
| | B3 | wt % | | | | | | |
| | B4 | wt % | 10 | | | | | |
| | B5 | wt % | | 10 | | | | |
| Processing oil | C1 | wt % | 12.5 | 10 | 15 | 26 | 28 | 30 |
| | C2 | wt % | | | | | | |
| Filler | D1 | wt % | 10 | 15 | 15 | 25.5 | 25.5 | 25.5 |
| | D2 | wt % | | | | | | |
| Polypropylene resin | E1 | wt % | | | | 22.5 | 18.5 | 14.5 |
| Antioxidant | AO | wt % | | | | | | |
| Evaluation item | Substrate adhesion | | ○ | ○ | ○ | X | X | X |
| | Adhesive strength between material layers | | X | X | X | — | — | — |

In the results of Table 1, examples 1 to 10 at least contain 20 wt % to 47.5 wt % of the thermoplastic elastomer, 30 wt % to 50 wt % of the styrene-based resin, 10 wt % to 15 wt % of the processing oil, and 7.5 wt % to 15 wt % of the filler, and therefore the printing materials made from the resin compositions of examples 1 to 10 have good adhesion with the substrate.

In comparison with examples 1 to 10 of Table 1, the resin compositions of comparative examples 1 to 3 also contain the same thermoplastic elastomer, processing oil, and filler, but the ratios thereof are not within the range of the disclosure, and the resin used in comparative examples 1 to 3 is polypropylene resin, and thus adhesion with the substrate is clearly unsatisfactory. Therefore, a subsequent adhesive strength test between the material layers was not performed.

Moreover, in the results of Table 1, examples 1 to 3 contain 42.5 wt % to 47.5 wt % of the thermoplastic elastomer, 30 wt % to 35 wt % of the styrene-based resin, 12.5 wt % of the processing oil, and 7.5 wt % to 10 wt % of the filler, and the content of styrene-based monomer unit in the styrene-based resin is 92 wt % to 100 wt %, and therefore the adhesive strength between the material layers is good.

Based on the above, in the disclosure, a resin composition formed by a specific component ratio is used as the filament, and the filament is used as a printing material of fused deposition modeling, and therefore the adhesion with the substrate can be improved, and the adhesive strength between material layers can be further improved.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A resin composition, comprising:
   a thermoplastic elastomer;
   a styrene-based resin;
   a processing oil; and
   a filler, wherein
   based on 100 wt % of the resin composition, a content of the thermoplastic elastomer is 20 wt % to 55 wt %, a content of the styrene-based resin is 25 wt % to 55 wt %, a content of the processing oil is 6 wt % to 18 wt %, and a content of the filler is 5 wt % to 20 wt %, and a number-average molecular weight of the thermoplastic elastomer is 20,000 to 180,000.

2. The resin composition of claim 1, wherein based on 100 wt % of the resin composition, the content of the thermoplastic elastomer is 30 wt % to 55 wt %, the content of the styrene-based resin is 25 wt % to 50 wt %, the content of the processing oil is 8 wt % to 15 wt %, and the content of the filler is 6 wt % to 13 wt %.

3. The resin composition of claim 1, wherein based on 100 wt % of the resin composition, the content of the thermoplastic elastomer is 40 wt % to 50 wt %, the content of the styrene-based resin is 30 wt % to 40 wt %, the content of the processing oil is 10 wt % to 15 wt %, and the content of the filler is 7 wt % to 11 wt %.

4. The resin composition of claim 1, wherein a content of styrene-based monomer unit in the styrene-based resin is 48 wt % to 100 wt %.

5. The resin composition of claim 1, wherein a content of styrene-based monomer unit in the styrene-based resin is 92 wt % to 100 wt %.

6. The resin composition of claim 1, wherein the styrene-based resin is at least one selected from the group consisting of a high-impact polystyrene (HIPS) resin, a polystyrene (PS) resin, an acrylonitrile-butadiene-styrene (ABS) resin, an acrylonitrile-styrene (AS) resin, and a methyl methacrylate-styrene (MS) resin.

7. The resin composition of claim 1, wherein the styrene-based resin is at least one selected from the group consisting of a HIPS resin and a PS resin.

8. The resin composition of claim 1, wherein the thermoplastic elastomer is at least one selected from the group consisting of a styrene-butadiene-styrene (SBS) block copolymer and a styrene-ethylene-butylene-styrene (SEBS) block copolymer.

9. The resin composition of claim 1, wherein a content of the styrene monomer unit in the thermoplastic elastomer is 10 wt % to 50 wt %.

10. The resin composition of claim 1, wherein a content of the styrene monomer unit in the thermoplastic elastomer is 20 wt % to 40 wt %.

11. The resin composition of claim 1, wherein a content of the styrene monomer unit in the thermoplastic elastomer is 25 wt % to 35 wt %.

12. The resin composition of claim 1, wherein a number-average molecular weight of the thermoplastic elastomer is 30,000 to 160,000.

13. The resin composition of claim 1, wherein a number-average molecular weight of the thermoplastic elastomer is 35,000 to 140,000.

14. The resin composition of claim 1, wherein the filler is at least one selected from the group consisting of calcium carbonate and magnesium carbonate.

15. The resin composition of claim 1, further comprising an antioxidant.

16. A filament formed by the resin composition as claimed in claim 1.

17. A molded article formed by the filament as claimed in claim 16.

* * * * *